May 15, 1962 — H. I. KESSLER — 3,034,229
TEACHING DEVICE
Filed Sept. 22, 1961 — 2 Sheets-Sheet 2
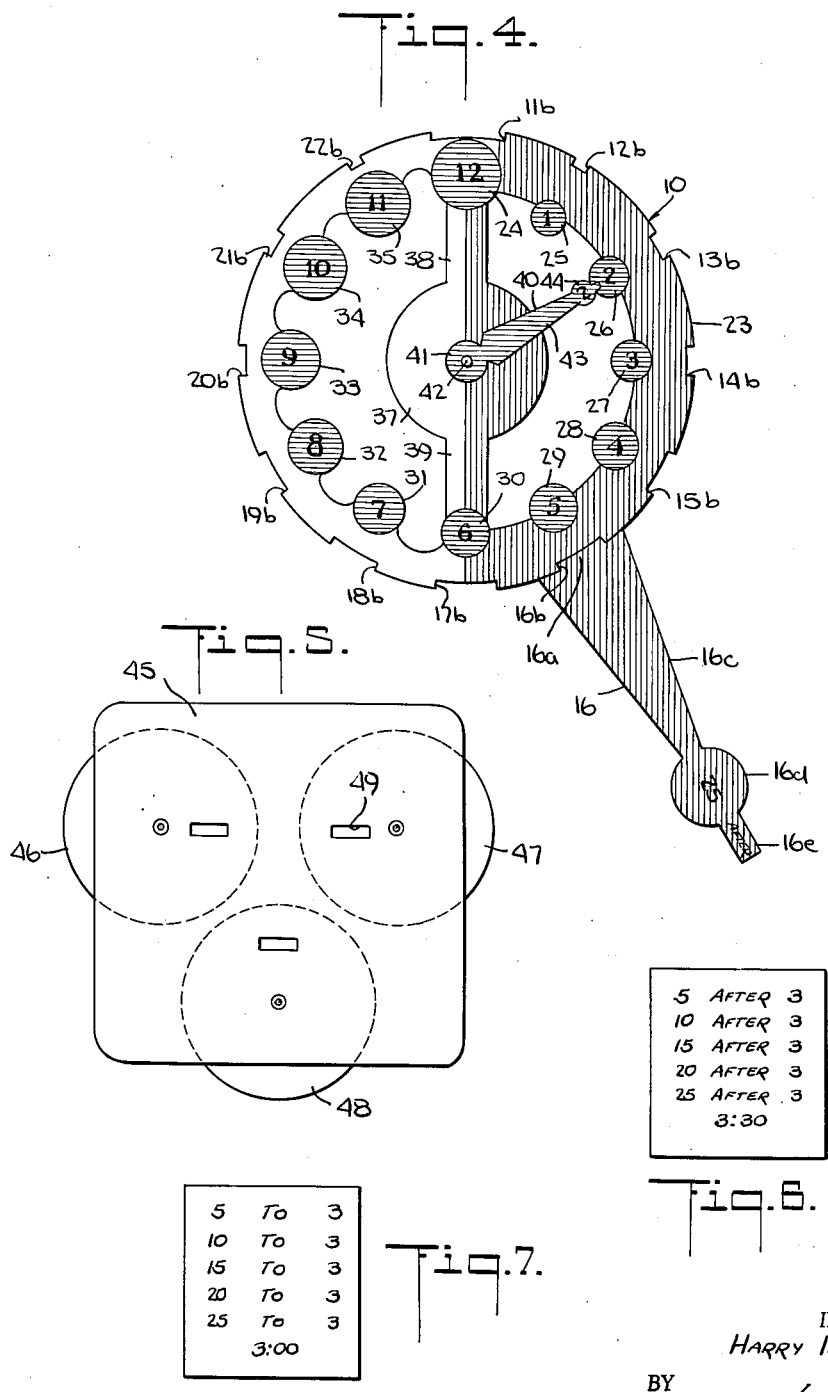
INVENTOR.
HARRY I. KESSLER
BY Kenyon & Kenyon
ATTORNEYS United States Patent Office 3,034,229
Patented May 15, 1962

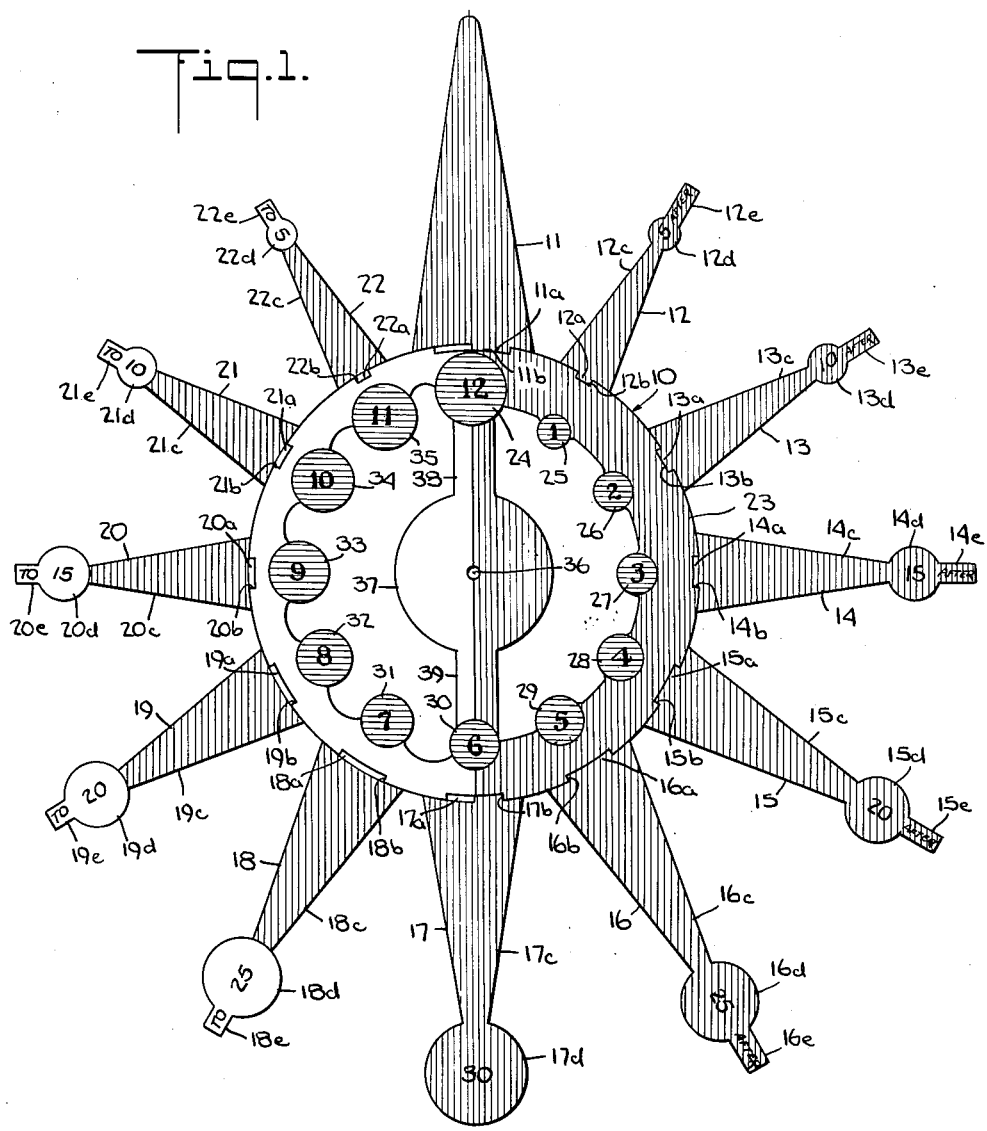

3,034,229
TEACHING DEVICE
Harry I. Kessler, 205 Sea Breeze Ave., Brooklyn, N.Y.
Filed Sept. 22, 1961, Ser. No. 139,981
7 Claims. (Cl. 35—39)

My invention relates to teaching devices, and more particularly relates to a device for teaching the telling of time.

Teaching the telling of time is particularly difficult. The cumulative experience of the teaching profession attests that the logic of telling time is very difficult to impart to the uninitiated student. The two situations where this difficulty is most acute is in the teaching of the very young and in the teaching of the foreign speaking.

The main problem with the very young, or with the retarded young, is that telling time is more highly conceptual than experienced lay adults realize, and moreover that a considerable amount of verbalization is involved that may be beyond the child's development. The main problem with the foreign speaking is that time is verbalized idiomatically in reference to English in many foreign tongues, thus making telling time in English more than a translation problem. With the young then, the problem is both conceptualization and verbalization, while with the foreign adults it is verbalization alone. The present invention is intended primarily for the teaching of pre-grade school children, preferably by their parents, but has the aforesaid utility as a teaching device for foreign speaking adults.

The present invention employs a novel and inventive clock face arrangement that, with or without certain hereindescribed auxiliary aids, utilizes several channels of approach to the mind of the student so that learning is greatly facilitated. In other words, the structure of the logical system by which we tell time is presented to the student by the clock face of the present invention in such a way as to give several aids to the learning by the student of that logical system, and moreover acts as a constant testing device so as to reinforce each stage of learning as it is attained.

It is accordingly an object of the present invention to provide a teaching device for teaching the telling of time from a clock face.

Another object of my invention is to provide such a teaching device that incorporates several aids toward understanding the logic of time telling so that the very young, and the non-verbally skilled generally, may be taught to tell time from a clock face.

Another object of my invention is to provide such a teaching device that provides a simple and inexpensive means for mothers to teach their pre-grade school children to tell time.

Another object of my invention is to provide such a teaching device that is more interesting to the child so as to maintain attention, and that teaches the time telling skills more quickly and with greater retention.

Another object of my invention is to provide such a teaching device that reinforces the child by testing as it illustrates to the child by examples.

These and further objects and advantages of my invention will become more apparent to those skilled in the art when the following detailed description thereof is studied in conjunction with the appended claims and the drawings wherein like numerals denote like parts in all views thereof and wherein:

FIGURE 1 is a plan view of a teaching device according to my invention showing a simulated clock face with all the position indicators in place;

FIGURE 2 is a plan view of an hour hand employed with the clock face of FIGURE 1;

FIGURE 3 is an elevation view of the hour hand of FIGURE 2;

FIGURE 4 is a plan view of the clock face of FIGURE 1 with the appropriate position indicator in place and the appropriate hour hand of FIGURE 2 in place in order to indicate an example time;

FIGURE 5 is a plan view of a first auxiliary aid to the clock face of FIGURE 1;

FIGURE 6 is a plan view of the obverse side of one of a series of cards forming a second auxiliary aid to the clockface of FIGURE 1; and FIGURE 7 is the reverse side of the example card of FIGURE 6.

Referring now to the drawings wherein one illustrative embodiment of my invention is shown, and particularly referring to FIGURE 1, my invention comprises in general:

A generally circular simulated clock face 10 which may be fabricated in cardboard, fiberboard, plastic, wood and the like, so that a relatively stiff thin sheet is presented that at the same time would not be potentially harmful to the child. A series of minute position indicators 11, 12, 13, 14, 15, 16, 17, 18, 19, 20, 21 and 22 are equally spaced about the perimeter of face 10 in a manner hereinafter described.

More particularly, face 10 comprises an outer periphery rim portion 23 which has a series of twelve equi-peripherally spaced circular portions 24, 25, 26, 27, 28, 29, 30, 31, 32, 33, 34 and 35. Upon these circular portions are respectively the numerals 12, 1, 2, 3, 4, 5, 6, 7, 8, 9, 10, 11, these numerals indicating the hour positions that each circular portion represents. The circular portions are of different diameters, so that starting with portion 25 which is the smallest, they increase in diameter according to their clockwise distance therefrom, until the largest is reached at 24. As will be realized from the numerals appearing thereon, the circular portions represent the various hours of the clock face by means of their diameters so that the higher numbered hour has the greater diametered circular portion denoting its position and carrying its numeral.

The geometric center of clock face 10 appears at hole 36, which is surrounded by center portion 37 which is affixed to peripheral portion 23 by means of webs 38 and 39 which connect to circular portions 24 and 30 respectively on peripheral portion 23. As mentioned before, each of circular portions 24 through 35 is of a different diameter. However, each is arranged so that the portion of its perimeter closest to hole 36 in center portion 37 is the same radial distance therefrom for a purpose to be hereinafter described.

Arranged about the outer perimeter of peripheral portion 23 of clock face 10 are twelve position indicators already described generally. Each of these indicators carries a tongue on its innermost end that interfits with a corresponding notch in the outer perimeter of clock face 10 so as to hold the particular position indicator or the particular peripheral position on clock face 10. The tongues and notches each match, but the matching pairs are of different sizes for each peripheral position. Thus tongue 12a of position indicator 12 is the smallest in width as is matching notch 12b on clock face 10. All notches and tongues are the same in depth, the differences being only in width.

The largest tongue and notch are 11a and 11b respectively for position indicator 11. Proceeding clockwise from indicator 11 the tongues and notches ascend from a minimum at 12a and 12b on 12 to a maximum at 17a and 17b on 17, the intermediate pairs such as 13a and 13b on 13, 14a and 14b on 14, 15a and 15b on 15, and 16a and 16b on 16 being progressively larger. The notch and tongue 17b and 17a on 17, while being the largest in the progression, is nevertheless smaller than the notch and tongue 11b and 11a on 11.

Proceeding counter-clockwise from 11, the position indicators 22, 21, 20, 19 and 18 have tongues and notches 22a and 22b, 21a and 21b, 20a and 20b, 19a and 19b, and 18a and 18b, respectively, which ascend in size in steady progression and are moreover equal in size and progression to the notches and tongues of the aforesaid clockwise progression, namely of indicators 12, 13, 14, 15, and 16. Again the same indicator 17 is the culmination in size in tongue 17a and notch 17b. The purpose and benefits of the arrangement of slots will be hereinafter described.

Position indicator 11, as is best shown in FIGURE 1, is generally triangular in outline. It is thereby differentiated from all the other position indicators which signifies its pre-eminent position as radial with the circular portion 24 which indicates the hour of 12 or the uppermost figure on the clockface 10. The teaching benefits of this arrangement will be explained hereinafter.

The other position indicators follow a scheme of proportioning according to their position, similar to the scheme for the proportions of the notches and tongues described hereinbefore. Each position indicator has a generally triangular portion, as for example 12c, which holds a disc portion 12d for example, and upon which is surmounted a tab 12e for example, all the foregoing examples being for position indicator 12. Proceeding clockwise, from indicator 12, the length of triangular portions 13c, 14c, 15c and 16c respectively, increase until a maximum is reached at 17c. So also the diameter of disc portions 13d, 14d, 15d and 16d increase from the minimum at 12d to the maximum at 17d. It should be noted that all the tabs 12e, 13e, 14e, 15e and 16e are the same size, and that position indicator 17 has no tab.

Proceeding counter-clockwise from indicator 11, triangular members 22c, 21c, 20c, 19c, 18c, as well as disc portions 22d, 21d, 20d, 19d, and 18d, all respectively on indicators 22, 21, 20, 19 and 18, increase in size just as was described for the clockwise progression above. Moreover the respective parts of the respective indicators in the counterclockwise direction are equal in size to their counterparts in the clockwise progression already described, with one exception. The tabs 22e, 21e, 20e, 19e and 18e are all also equal in size, but are all smaller than the tabs described above in the clockwise progression.

Appearing on the disc portion 12d of indicator 12 is the numeral "5," while appearing on the tab 12e is the word "after." Similarly on the resepctive portions of indicators 13, 14, 15 and 16 are the numerals "10," "15," "20" and "25" respectively, and the word "after" respectively on each. The indicator 17 bears only the numeral "30" on its disc portion 17d. Similarly the indicators 22, 21, 20, 19 and 18 respectively have the numerals "5," "10," "15," "20," and "25" on their afore-described disc portions, and also each have the word "to' on their aforesaid tab portions.

The clock face 10 and associated indicators 11 through 22 are colored to reinforce and make further predominant the logic of the time face. It should be understood that any two different colors or shaded (even of black) may be employed when this expedient is used, but for purposes of illustration it will be assumed that blue and pink have been chosen.

Thus the clock face 10 is colored pink left of the diameter through circular portions 24 and 30, and is colored blue right of that diameter. The circular portions 24 through 35 are the only exceptions to this scheme, and they are given a third color for prominence, in the instant example, yellow. Position indicators 12 through 16 are entirely blue. Position indicator 17 is entirely blue, except that tongue 17a is pink on its left half and blue on its right half. It will be appreciated that with this arrangement the tongue 17a maches the split in colors along the aforesaid diameter through circular portions 24 and 30.

The indicator 11 is also all blue, but again, like indicator 17, it has a split color tongue 11a. Again the left half of the tongue 11a is pink and the right half blue, in order to match the clock face division. But it will be noted that indicators 11 and 17 have their respective pink and blue halves of their tongues on opposite sides, the fact that their pink is on the left in each (and therefore matching the clock face) resulting only from their proper peripheral positioning. This is an aid to teaching the distinctions between these two positions which are otherwise often confused by the child. This will become more clear hereinafter.

The remaining indicators, 18 through 22, each have a pink tongue to match that portion of clock face 10, and a pink disc portion and tab portion, but are blue as to their triangular portions.

Referring now to FIGURES 2 and 3, there is shown therein one of a number of hour hands 40. There are twelve such hands, each identical, except that a different numeral appears thereon. The hand 40 shown has a large circular portion 41 having a peg 42 therethrough and a body portion 43 surmounted by a numeral portion 44 having a pointer 44a extending therefrom. On numeral portion 44 is one of several numerals indicating the hours from "1" to "12" in series. Shown is the hand 40 having the numeral "2" thereon. There are of course twelve such hands 40. The length of the hand 40 from peg 42 to pointer 44a is such that the pointer will reach and slightly overlie any of the circular portions 24 through 35 on clock face 10 when peg 42 is in place in hole 36 therein, as is hereinafter described. The hands 40 are preferably colored the same as circular portions 24 through 35, in the present example, yellow.

Shown in FIGURE 5 is a first auxiliary aid. A double thickness card 45 is stapled or otherwise held together, and has three pivoted wheels held therebetween as at 46, 47 and 48 with the peripheral edge of each wheel protruding from each of three respective sides of card 45. On wheel 46 are peripheral numerals from 5 to 25 in steps of 5. On the obverse side of card 45 these numerals appear in pink to indicate they are "to" the hour. On the reverse side of card 45 the same numerals appear on wheel 46, but in blue to indicate they are "after" the hour. On the obverse side of card 45 only, wheel 47 has yellow peripheral numerals from 1 to 12 in units to indicate hours. These latter numerals are consequently in yellow. The lower wheel 48 also has numerals only on the obverse side, and these numerals are "1:30," "2:30" etc. up to "12:30." A window 49 is appropriately located on card 45 for each of wheels 46, 47 and 48 so that any given numeral on each wheel may be dialed into the appropriate window.

A second auxiliary aid is shown in FIGURES 6 and 7. Twelve individual cards are provided, one for each hour of the clock from "1" to "12." Shown in FIGURES 6 and 7 is the obverse and reverse of one such card, the example being the card for 3 o'clock. The obverse side shown in FIGURE 6 has downward in a column in blue figures, the legends "5 after 3," "10 after 3," etc. up to "25 after 3" and then "3:30." The reverse card side of FIGURE 7 has, in pink numerals downward in a column, the legends "5 to 3," "10 to 3," etc. up to "25 to 3."

In operation, the present invention is employed as follows: The mother or other teacher of the child allows the child to view the complete arrangement of FIGURE 1 and to otherwise completely familiarize itself with the relationship of the parts. The mother may then demonstrate a time. For these purposes times between 5 minute units are not interpolated. As shown in FIGURE 4, the mother may select, for example, the hour hand 40 having the numeral "2" thereon. The peg 42 will be inserted in hole 36 of clock face 10, and the numeral portion 44 of the hour hand 40 will be rotated to slightly overlie the circular portion 26 on clock face 10. The numeral "2" on hour hand 40 will thus be adjacent to the numeral "2" on clock face 10. The correspondence of yellow color helps indicate and teach that the hour hands and the hour numerals go together.

The mother may then select position indicator 16 having the legend "25 after" thereon, and after demonstrating to the child that the tongue 16a of indicator 16 is the only one that matches notch 16b both in color and size, may insert indicator 16 into its peripheral position. Appropriate repetitions may be made to reinforce into the child the idea that this combination of positions and colors (FIGURE 4) indicates the verbalization known as "25 after 2."

It will now be apparent how the various aids to teaching operate psychologically upon the child. The color and size of the tongues on the end of each indicator have to match the appropriate notch on the clock face. The size of the indicator and the size of the numeral disc thereon are proportional to the absolute value of the numeral thereon, thereby helping the child to grasp the numerical significance of the difference between two different time-positions. The colors, for example, pink and blue, help the child to understand that there is a difference between "after" and "to" the hour, although the numerical values may be otherwise confusingly the same.

Most teachers find that the hours and minutes between the vertical positions are the hardest to teach since they seem indistinguishable from one another to the child. The different sizes, colors and positions of the present embodiment overcome this difficulty very well. The complete separation of minutes into the peripheral indicators and hours into the inward circular portions helps the child to realize that there are two meanings to any given angular position on the face 10. Finally, the different treatment of indicators 11 and 17 from the rest and from one another helps immediately to remove confusion between them and to set the reference points from which the other positions may be learned. The split colors on the tongues of indicators 11 and 17 are such that taken with the difference in size of these tongues, the two positions cannot be confused.

The mother or other teacher may demonstrate various time-positions to the child, as shown by example in FIGURE 4, and described above. All the various times may thus be covered. The mother may also test the child by asking it to place the proper positions for a given time. It is clear that the relation between the verbalizations, the positions on the face 10, and the quantitative meanings of the various numerical quantities, all of which may be new to the child, are expeditiously taught by the device of the present invention.

To prevent randomness of testing by the mother after she has demonstrated certain times, the auxiliary aids of FIGURES 5 through 7 may be resorted to. On the device of FIGURE 5, for example, various commands may be dialed. The child may then be taught to put the proper positions on the clock face. In addition to verbalization teaching, this teaches him how to recognize the printed time. The process is, of course, reversible, wherein the position is placed by the mother and the child must find the proper designation on the device of FIGURE 5.

The cards of FIGURES 6 and 7 are intended primarily as exercises for the child, particularly by itself, to employ. By going through the cards in sequence, and the columns thereon in sequence, the relation between the various time-positions and their verbalizations is practiced and better understood as a continuous time-process. These cards, too, can be used reversibly for teaching and testing. Another approach, best used in the latter stages of learning, is to have the child first duplicate real times on real clocks upon the simulated clock herein, and later to read directly off the real clock without the intermediate aid of the by-then-familiar device of the present invention. Such a real clock can either be a true mechanical time piece, or a true clockface in cardboard or such, but without mechanical works.

It is apparent that for the first time the teaching device of the present invention uses several channels (color, size, association, proportion, verbalization, numeralization) to reach the child's mind and make him understand the otherwise abstract system known as "telling time." As mentioned before, the device is equally valuable in helping foreign adults to verbalize time in English. The device and its auxiliary aids, or the device alone, offers unlimited opportunities for experimentation and learning. One particular advantage arising therefrom is that the child is much less likely to become bored, and thus learns more quickly and cooperates better.

Many variations from the above-described embodiment may be practiced by those skilled in the art. All such variations are contemplated since the instant embodiment is merely illustrative of the invention, and does limit it. The only true scope of the invention is to be found in the appended claims.

What is claimed is:

1. A time-telling teaching device comprising a generally circular simulated clock-face having an outer peripheral rim portion including an inwardly extending series of twelve equi-peripherally spaced circular hour indicator portions and an outer series of twelve equi-peripherally spaced notches each of which is radially in line with one of said circular portions, a series of elongated minute position indicators each having a tongue at one end thereof removably mated with one of said notches, the dimensions of said indicators varying with said peripheral spacing around said rim portion, means defining an aperture at the center of said clock-face, and an hour hand having a pivot peg mounted in said aperture means with a pointer portion thereof reaching radially outward to any of said circular hour indicator portions.

2. A time-telling teaching device comprising a generally circular simulated clock-face having an outer peripheral rim portion including an outwardly extending series of twelve equi-peripherally spaced circular hour indicator portions which are correlated with the hour positions from one o'clock to twelve o'clock inclusive and an outer series of twelve equi-peripherally spaced notches each of which is radially in line with one of said circular portions, said notches being of varying sizes so that the notches aligned with the circular portions correlated with the one o'clock to six o'clock positions inclusive increase in size while the notches aligned with the circular portions correlated with the six o'clock to eleven o'clock portions inclusive decrease in size, a series of elongated minute position indicators each having a tongue at one end thereof removably mated with one of said notches and being matched thereto in size, the dimensions of each of said indicators varying with their respective peripheral spacing around said rim portion by being correlated to the notch and tongue size associated therewith, means defining an aperture at the center of said clock-face, and an hour hand having a pivot peg mounted in said aperture means with a pointer portion thereof reaching radially outward to any of said circular hour indicator portions.

3. A time-telling teaching device comprising a generally circular simulated clock-face having an outer peripheral rim portion including an outwardly extending series of twelve equi-peripherally spaced circular hour indicator portions which are correlated with the hour positions from one o'clock to twelve o'clock inclusive and an outer series of twelve equi-peripherally spaced notches each of which is radially in line with one of said circular portions, said notches being of varying sizes so that the notches aligned with the circular portions correlated with the one o'clock to six o'clock positions inclusive increase in size while the notches aligned with the circular portions correlated with the six o'clock to eleven o'clock portions inclusive decrease in size, the notch aligned with the twelve o'clock circular portion being the largest of all said notches, a series of elongated minute position indicators each having a tongue at one end thereof removably mated with one of said notches and being matched thereto in size, the uppermost minute position indicator correlated with the twelve o'clock position being of a generally elongated shape, the minute position indicator correlated with the six o'clock position being of equal length thereto including a surmounting disc portion thereon, the minute position indicators situated in both the clockwise and counterclockwise directions from said six o'clock position decreasing proportionally in length and in diameter of the disc portions associated therewith, each disc portion in said counterclockwise and said clockwise directions having a tabe extending outwardly therefrom, the tabs of said counterclockwise direction indicators being all of uniformly larger size than the uniformly sized tabs of said clockwise direction indicators, means defining an aperture at the center of said clockface, and an hour hand having a pivot peg mounted in said aperture means with a pointer portion thereof reaching radially outward to any of said circular hour indicator portions.

4. A time-telling teaching device according to claim 3 wherein each of said circular hour indicator portions is of a diameter correlated to the hour represented so that the portion representing one o'clock is smallest and the portion representing twelve o'clock is largest and the portions inbetween are proportionately sized.

5. A time-telling teaching device according to claim 4 wherein any of a plurality of twelve hour hands are insertable into said means defining an aperture, and each said hour hand has one of the numerals one to twelve inclusive adjacent the pointer portion thereof.

6. A time-telling teaching device according to claim 3 wherein a diameter line exists across said clock-face from the said twelve o'clock position to the said six o'clock position, and the portion to the left of said diameter is a first color while the portion to the right of said diameter is a second color, and wherein said circular hour indicator portions are in a third color, said hour hand pointer also being in said third color, the said disc portions of the minute indicators clockwise of said uppermost indicator having disc portions in said second color, up to and including the position indicator diametrically opposed to said uppermost indicator, while the remaining minute indicators counterclockwise of said uppermost indicator have disc portions in said first color, and the tongue portions of all said indicators being in the same colors as the respective disc portions except that the uppermost indicator and the diametrically opposed indicator each has a split color being said first color on the left portion thereof and said second color on the right portion thereof.

7. A time-telling teaching device according to claim 6 wherein each disc portion and each tab portion has a legend thereon, said disc portions and tabs of said indicators clockwise after said uppermost indicator having respectively the legends 5 after, 10 after, 15 after, 20 aafter and 25 after, while the disc portions and tabs of the indicators counterclockwise after said uppermost indicator have the legends respectively of 5 to, 10 to, 15 to, 20 to, and 25 to, and wherein the indicator diametrically opposed to said uppermost indicator has the legend 30 on the disc portion thereof.

No references cited.